United States Patent
Regmi et al.

(10) Patent No.: US 10,862,970 B2
(45) Date of Patent: Dec. 8, 2020

(54) CALL-AHEAD DOWNLOADING TO VEHICLES

(71) Applicant: Ford Global Technologies, LLC, Dearborn, MI (US)

(72) Inventors: Sagar Kumar Regmi, San Jose, CA (US); Yun Ho Lee, Pleasanton, CA (US); Lynn Valerie Keiser, San Carlos, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 204 days.

(21) Appl. No.: 15/625,613

(22) Filed: Jun. 16, 2017

(65) Prior Publication Data

US 2018/0367613 A1 Dec. 20, 2018

(51) Int. Cl.
*H04L 29/08* (2006.01)
*H04W 4/44* (2018.01)
*H04W 4/024* (2018.01)

(52) U.S. Cl.
CPC ............ *H04L 67/12* (2013.01); *H04W 4/024* (2018.02); *H04W 4/44* (2018.02); *H04L 67/1097* (2013.01)

(58) Field of Classification Search
CPC ...... H04L 67/1097; H04L 67/12; H04W 4/44; H04W 4/024
USPC ......... 709/219; 701/507, 415, 540, 462, 430
See application file for complete search history.

(56) References Cited

U.S. PATENT DOCUMENTS

| | | | |
|---|---|---|---|
| 6,553,308 B1 * | 4/2003 | Uhlmann | B61L 29/24 340/988 |
| 6,829,531 B2 | 12/2004 | Lee | |
| 7,317,973 B2 | 1/2008 | Dieterle | |
| 7,539,482 B2 * | 5/2009 | Kitano | G01C 21/26 455/412.1 |
| 7,653,481 B2 * | 1/2010 | Tramel | G08G 1/005 701/412 |
| 7,865,303 B2 * | 1/2011 | Weiss | G01C 21/3446 340/908 |
| 8,019,533 B2 * | 9/2011 | Mudalige | G01C 21/26 370/328 |
| 8,219,710 B2 * | 7/2012 | Yi | H04L 29/12283 340/988 |

(Continued)

FOREIGN PATENT DOCUMENTS

| | | |
|---|---|---|
| CN | 105871831 A | 8/2016 |
| EP | 2658211 | 10/2013 |

(Continued)

*Primary Examiner* — Vivek Srivastava
*Assistant Examiner* — Binod J Kunwar
(74) *Attorney, Agent, or Firm* — David R. Stevens; Stevens Law Group (57) ABSTRACT

A vehicle controller communicates with a cellular communication system to request content. The content is transmitted to one or more road side units with storage (RSS) lying on the vehicles known or inferred trajectory. When the vehicle passes by the RSS some or all of the content is transmitted to the vehicle using a short-range, high-bandwidth communication protocol. The content may be divided into segments and each segment sent to an RSS. The segments are sized according to a capacity of the RSS and the amount of time the vehicle is expected to spend traversing a range of the RSS. Content may be cached in the RSS for use by other vehicles.

16 Claims, 6 Drawing Sheets

(56) References Cited

U.S. PATENT DOCUMENTS

| | | | | |
|---|---|---|---|---|
| 8,295,257 B2* | 10/2012 | Chen | | G08G 1/094 |
| | | | | 370/338 |
| 9,134,426 B1* | 9/2015 | Siris | | G01S 19/07 |
| 9,212,914 B2* | 12/2015 | Kolar | | G01C 21/165 |
| 9,435,652 B2* | 9/2016 | Ralston | | G01C 21/26 |
| 2008/0027636 A1* | 1/2008 | Tengler | | G08G 1/096811 |
| | | | | 701/425 |
| 2009/0100072 A1* | 4/2009 | Shimoshimano | | G08G 1/093 |
| 2010/0070167 A1 | 3/2010 | Mudalige | | |
| 2010/0100972 A1* | 4/2010 | Lemieux | | G06F 21/57 |
| | | | | 726/34 |
| 2011/0208429 A1* | 8/2011 | Zheng | | G01C 21/3484 |
| | | | | 701/533 |
| 2013/0342333 A1* | 12/2013 | Hutchings | | G08G 1/096791 |
| | | | | 340/435 |
| 2014/0019041 A1* | 1/2014 | Kluge | | G01C 21/3469 |
| | | | | 701/430 |
| 2014/0274069 A1 | 9/2014 | Scheim | | |
| 2016/0047673 A1* | 2/2016 | Bottari | | G01C 21/3629 |
| | | | | 701/540 |
| 2017/0241791 A1* | 8/2017 | Madigan | | G06Q 40/08 |
| 2017/0263120 A1* | 9/2017 | Durie, Jr. | | G08G 1/205 |
| 2018/0024568 A1* | 1/2018 | Fridman | | G08G 1/096725 |
| | | | | 701/28 |
| 2018/0190016 A1* | 7/2018 | Yang | | G06T 7/11 |
| 2020/0059946 A1* | 2/2020 | Lee | | H04L 5/0094 |

FOREIGN PATENT DOCUMENTS

| | | |
|---|---|---|
| KR | 101037922 B1 | 5/2011 |
| WO | WO 2008/120164 | 10/2008 |
| WO | WO 2010/104525 | 9/2010 |

\* cited by examiner

CALL-AHEAD DOWNLOADING TO VEHICLES

BACKGROUND

Field of the Invention

This invention relates to wireless communication with vehicles.

Background of the Invention

Cellular communication systems are available in many vehicles. This enables the vehicle to perform communication on behalf of occupants of the vehicle as well as send and receive data regarding operation of the vehicle itself. However, cellular data communication is expensive and relatively slow. Wi-Fi hotspots exist but they are not universally available and are relatively slow.

The system and method disclosed herein provides an improved approach for high-speed wireless communication with a vehicle.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
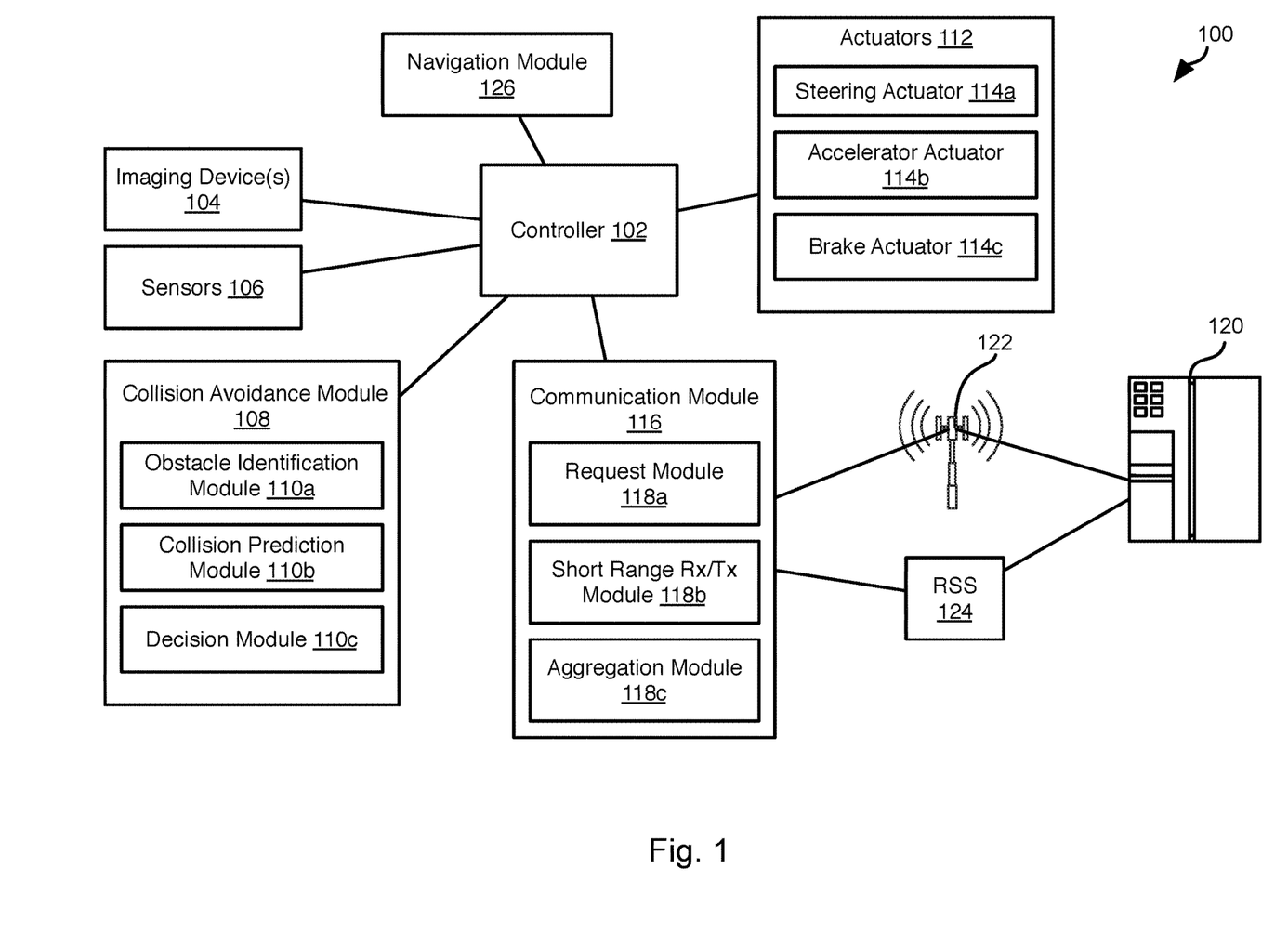
FIG. 1 is a schematic block diagram of a system for implementing embodiments of the invention.

Referring to FIG. 1, a system 100 may include a controller 102 housed within a vehicle. The vehicle may include any vehicle known in the art. The vehicle may have all of the structures and features of any vehicle known in the art including, wheels, a drive train coupled to the wheels, an engine coupled to the drive train, a steering system, a braking system, and other systems known in the art to be included in a vehicle.

As discussed in greater detail herein, the controller 102 may perform autonomous navigation and collision avoidance. The controller 102 may receive one or more image streams from one or more imaging devices 104. For example, one or more cameras may be mounted to the vehicle and output image streams received by the controller 102.

The controller 102 may further receive outputs of one or more other sensors 106 such as a RADAR (Radio Distancing and Ranging) sensor, LIDAR (Light Distancing and Ranging) sensor, SONAR (Sound Navigation and Ranging) sensor, ultrasonic sensor, and the like.

The controller 102 may execute a collision avoidance module 108 that receives the image streams from imaging devices 104 and output data from the sensors 106 and identifies possible obstacles and takes measures to avoid them.

The collision avoidance module 108 may include an obstacle identification module 110a, a collision prediction module 110b, and a decision module 110c. The obstacle identification module 110a analyzes the outputs of the imaging devices 104 and sensors 106 and identifies potential obstacles, including people, animals, vehicles, buildings, curbs, and other objects and structures. In particular, the obstacle identification module 110a may identify vehicle images in the image stream.

The collision prediction module 110b predicts which obstacle images are likely to collide with the vehicle based on its current trajectory or current intended path. The decision module 110c may make a decision to stop, accelerate, turn, etc. in order to avoid obstacles. The manner in which the collision prediction module 110b predicts potential collisions and the manner in which the decision module 110c takes action to avoid potential collisions may be according to any method or system known in the art of autonomous vehicles.

The decision module 110c may control the trajectory of the vehicle by actuating one or more actuators 112 controlling the direction and speed of the vehicle. For example, the actuators 112 may include a steering actuator 114a, an accelerator actuator 114b, and a brake actuator 114c. The configuration of the actuators 114a-114c may be according to any implementation of such actuators known in the art of autonomous vehicles.

The controller may include a communication module 116. The communication module may include a request module 118a that requests data from a server system 120, such as a server system implementing a cloud. The request module 118a may also receive notifications regarding data to be pushed to the controller 102 by the server system 120. The request module 118a may communicate with the server system 120 over a cellular data communication network 122.

The communication module 116 may further include a short range Rx/Tx module 118b that receive high-bandwidth downloads of data in bursts from road side units with storage (RSS) 124. The RSS 124 may be a computer system with network connectivity to the server system 120 and short-range communication capabilities as described in greater detail below. The RSS 124 may be mounted anywhere along a roadway, such as in a dedicated housing mounted to the ground, fastened to a light pole or cellular communication tower, mounted to a building, or fastened to any other structure along a roadway.

The short-range communication protocol used by the RSS 124 may have a bandwidth many times (e.g., greater than 10 times) that of communication over the cellular communication network 122. As described in greater detail below, data is downloaded from the server system 120 to the RSS 124 and stored, such as in a non-transitory storage device such as a flash drive, hard disk drive, or the like. In some implementations, the RSS 124 will have at least 100 GB (gigabyte) and possibly at least 1 TB (terabyte) of storage. For example, the server system 120 may be coupled to the RSS 124 by means of a network such as a local area network (LAN), wide area network (WAN), the Internet, or any other type of wired or wireless network connection. When the vehicle housing the controller 102 passes within a transmission range of the RSS 124, data is transmitted over a high-bandwidth short-range protocol to the vehicle. A plurality of RSSs 124 may be distributed geographically and content may be distributed among multiple RSSs 124 lying along the trajectory of a vehicle in order to provide the content to the vehicle.

The communication module 116 may further include an aggregation module 118c. As described in detail below, content may be segmented and downloaded to multiple RSSs 124. Accordingly, the aggregation module 118c may reassemble these segments to obtain original content.

The controller 102 may include or access a navigation module 126. The navigation module may perform a routing function to determine a route between the vehicle's current location and a desired destination. The navigation module 126 may operate in a conventional manner using conventional maps and a global position system (GPS) receiver. The navigation module 126 may also use high-resolution map data in order to facilitate autonomous navigation and obstacle avoidance. As discussed below, high-resolution map data for a given location may be provided to the controller 102 using one or more RSSs 124. The navigation module 126 may further provide navigation data to the server system 120 to enable the identification of RSSs 124 lying on the trajectory of the vehicle.

Figure 2:
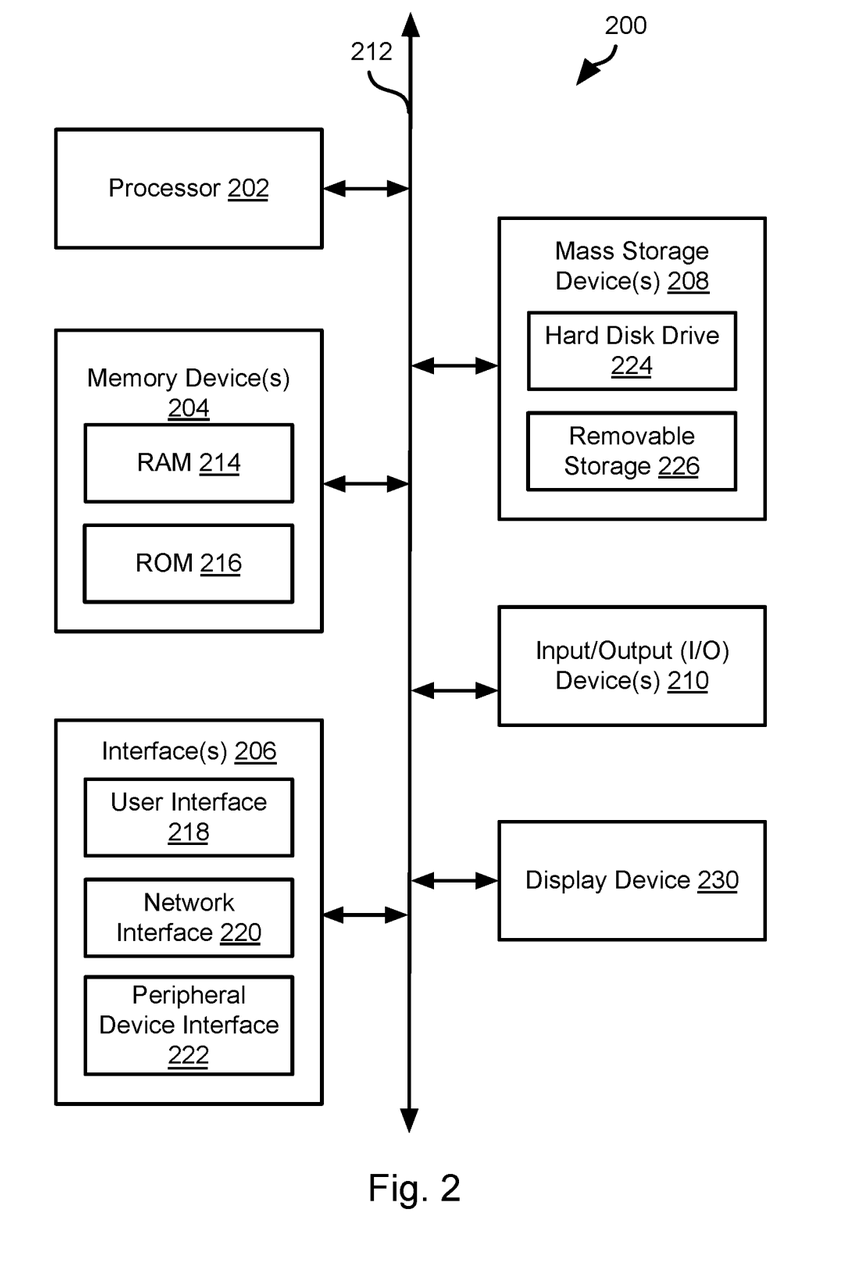
FIG. 2 is a schematic block diagram of an example computing system that may be used to implement the system and methods disclosed herein.

FIG. 2 is a block diagram illustrating an example computing device 200. Computing device 200 may be used to perform various procedures, such as those discussed herein. The controller 102, server system 120, and RSS 124 may have some or all of the attributes of the computing device 200.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212.

Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for pointing devices (mice, track pad, etc.), keyboards, and the like.

Bus 212 allows processor(s) 202, memory device(s) 204, interface(s) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
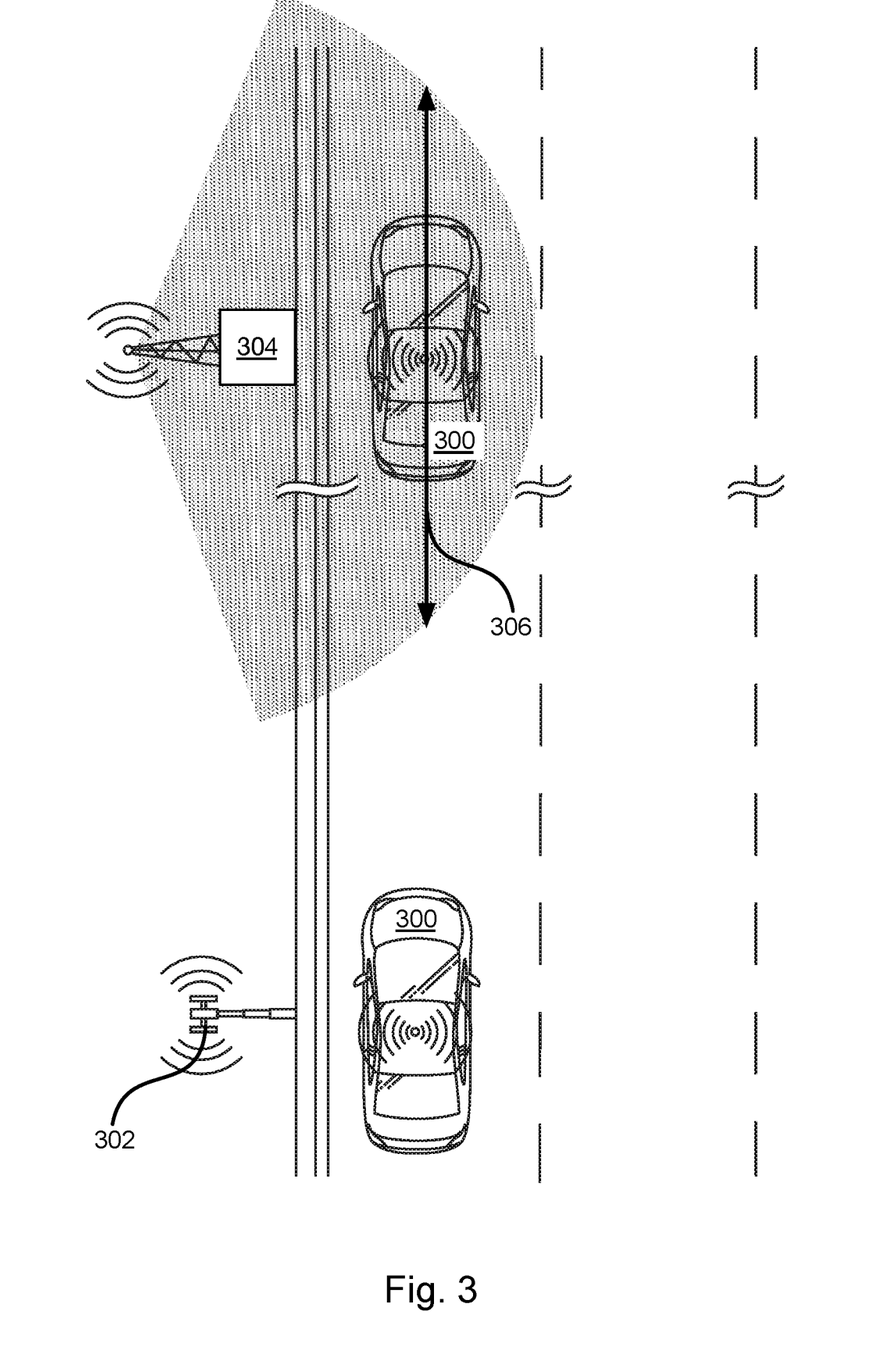
FIG. 3 is a schematic diagram of a connected vehicle in accordance with an embodiment of the present invention.

The diagram of FIG. 3 illustrates one example of operation of the system 100. A vehicle 300 housing the controller 102 transmits a request for content to a cellular base station 302, which forwards the request to the server system 120. The server system downloads the requested content to an RSS 304. As shown, the vehicle 300 will be within a transmission range of the RSS 304 for a transit window 306. While in that window 306, the RSS 304 transmits the content to the controller 102 using a high-bandwidth, short-range wireless protocol such as WI-FI (11ac/ad/ax/ay/etc.), 5G protocol (such as mmWave), LI-FI, or any other high speed protocol. Communication over the short-range wireless protocol may be implemented by the RSS 124, 304 using a MIMO (multiple in multiple out) antenna system.

The system and methods disclosed herein are independent of the actual content that is transferred. One useful application is the downloading of high-resolution navigation data used by autonomous vehicles. A large amount of data is required and it may not be feasible to store this data on the vehicle for all possible routes of an autonomous vehicle. Accordingly, upon determining a trajectory, the autonomous vehicle may request and download high-resolution navigation data for that route in the manner described herein. Other content that may be downloaded include media (movies, television shows, music, etc.) or any other data.

Figure 4:
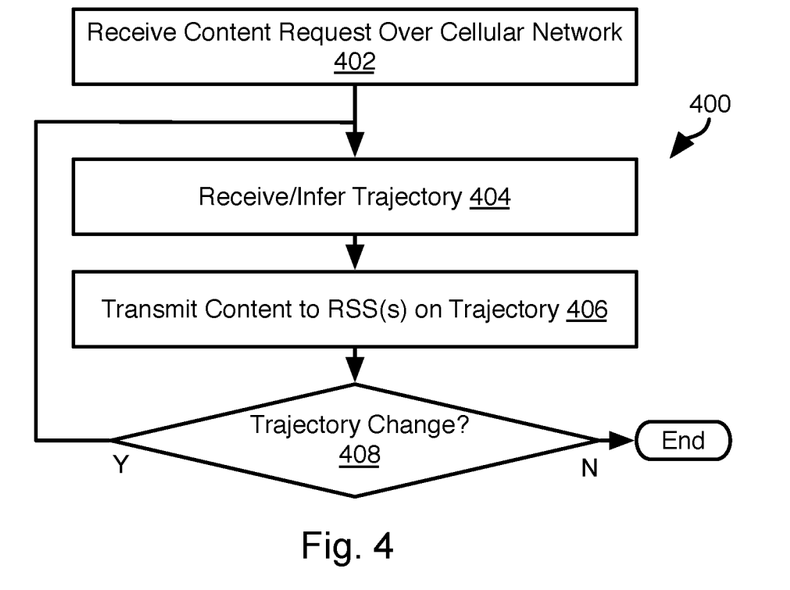
FIG. 4 is a process flow diagram of a method for downloading content to a vehicle in accordance with an embodiment of the present invention.

Referring to FIG. 4, the illustrated method 400 may be executed by the server system 120 with respect to a vehicle and its corresponding controller 102. The method 400 may include receiving 402 a request for content over the cellular network 122. The request may be user initiated (e.g., by a user requesting media) or by the controller 102 (e.g., to request high-resolution routing data along a planned route).

The method 400 may further include receiving 404 or inferring a trajectory of the vehicle from which the request was received. For example, the controller 102 may also transmit a planned route to the server system 120. Alternatively, step 404 may include inferring a trajectory of the vehicle. For example, the controller 102 may transmit its current velocity and location to the controller 102. The controller 102 may infer a trajectory of the vehicle, or a set of possible trajectories. For example, the location may be compared to records of past trips by the vehicle. The routes of these past trips, or a highest frequency route of these past trips, may then be used as the inferred trajectory of the vehicle. Alternatively, where such data is not available, the trajectory may be inferred from general traffic data, i.e. the vehicle may be inferred to traverse segments of streets starting at the location having the highest usage and lying on a route that is calculated to avoid bad weather or bad road conditions. Multiple inferred trajectories traversing various high-probability routes according to general traffic data may be used rather than a single route.

The method 400 may then include transmitting 406 portions of the requested content to one or more RSSs 124 that lie ahead of the vehicle along the one or more inferred trajectories. The amount of the content sent to each RSS 124 along a particular trajectory and segmentation of the content may be determined according to the method 500 of FIG. 5. As the vehicle passes within the transit window 306 of these RSSs 124, these RSSs 124 will then attempt to download the portion of the content downloaded to these RSSs 124.

The method 408 may further include evaluating 408 whether either of (a) the vehicle departed from the one or more trajectories of step 404 prior to traversing the transit windows 306 of the RSSs 124 to which the content was transmitted at step 406 or (b) the transit windows 306 of the RSSs of step 406 were traversed without successful downloading of the entire content to the vehicle. For example, the vehicle may transmit its location periodically to the server system 120, which may then determine whether the vehicle has departed from the one or more trajectories of step 404. The vehicle and/or each RSS 124 may further transmit success, failure, and/or amount of data downloaded when the vehicle traverses the transit window of the each RSS

124. The server system 120 may then determine whether the aggregated data reported as successfully downloaded to the vehicle by one or more RSSs 124 constituted the entirety of the content.

If either of (a) or (b) are found to be met, the process may repeat steps 404 through 408. In particular, steps 404 and 406 may be repeated for that portion of the content that was not determined to be successfully downloaded at step 408. For the current location of the vehicle, the method 400 may repeat the steps of receiving 404 or inferring one or more new trajectories and transmitting 406 the remaining portion of the content to RSSs 124 along the one or more new trajectories. Steps 404 through 408 may be repeated until the content is completely downloaded to the vehicle.

Figure 5:
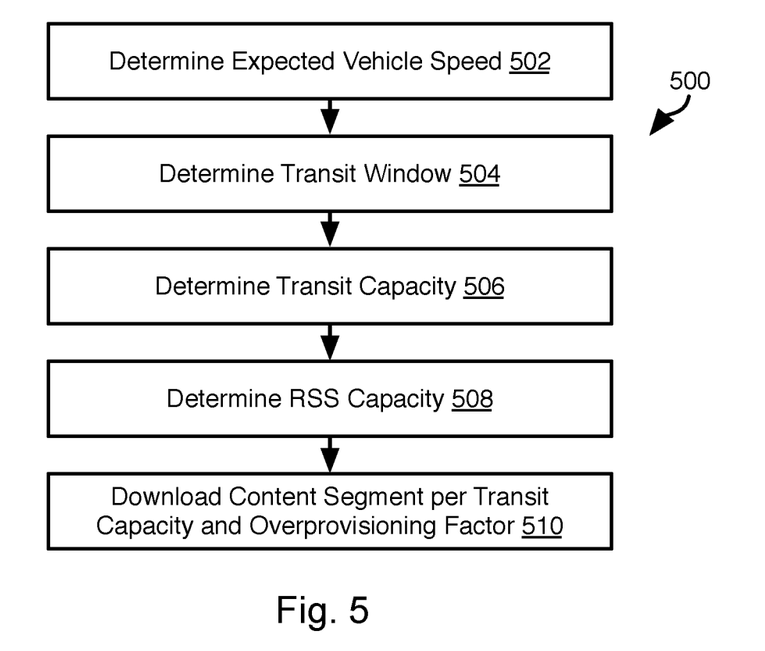
FIG. 5 is a process flow diagram of a method for downloading content to a roadside unit with storage (RSS) in accordance with an embodiment of the present invention.

FIG. 5 illustrates a method 500 for segmenting content and distributing the content to the RSSs 124 identified as being along the vehicle's trajectory as described above with respect to FIG. 4.

The method 500 may be executed for one or more RSSs 124 along a trajectory of the received trajectory or one or more inferred trajectories. For example, starting at the RSS 124 closest to the current location of the vehicle on a trajectory, the method 500 may be executed. This may be repeated for other RSSs 124 moving away from the vehicle along the trajectory until all of the content is assigned to at least one RSS 124. Where there are multiple inferred trajectories, this process may be performed for each of them.

The method 500 may include determining 502 an expected vehicle speed. This may include the posted speed limit for the road traversing the range of the RSS 124, a most recent measured traffic speed for the road, an average traffic speed for an expected time of traversal of the range of the RSS 124, an average speed of the vehicle when previously traversing the road, or other measure of expected speed.

The method 500 may further include determining 504 or retrieving the transit window 306 for the RSS 124 and determining 506 the transit capacity of the RSS 124 from the transit window 306 and the vehicle speed. For example, for an expected vehicle speed V (distance per second), a transit window 306 of distance D, a bandwidth B of the RSS 124 in bytes per second (or other data length per second), and a latency L, a transit capacity C may be calculated as C=((D/V)−L)*B. The latency L may include delays in establishing a connection between the RSS 124 and the vehicle.

The method 500 may further include determining 508 a storage capacity of the RSS 124. This may include receiving, from the RSS 124, a report of the capacity of the RSS 124. Alternatively, the server system 120 may track content downloaded to the RSS 124 and evaluate this with respect to a stored capacity for the RSS 124. In some instances, if the RSS 124 lacks capacity, the server system 120 may transmit a purge instruction to remove some content previously stored on the RSS 124 (see FIG. 6).

The method 500 may then include downloading 510 a segment of the content according to the transit capacity and an overprovisioning factor. For example, content may be represented by file F(n), where n is a value from 0 to N−1, where N is the number of bytes (or other unit) in the content. For the first RSS 124 processed, the segment may start at 0. For subsequent RSS 124, the segment may be determined with respect to position F(i), where F(i−1) is the last byte (or other unit) transmitted to the immediately preceding RSS 124.

The segment sent to the RSS 124 may include bytes F(i−A) to F(i+C+B), where A provides for an overlap between segments to account for the possibility that a download may not be completed. Factor B may be smaller or larger than A and provides for additional length of the segment to account for the possibility that the vehicle may remain longer than expected in the range of the RSS 124. In this example, the length of the segment is therefore C+A+B.

In some embodiments, the length of the segment may be limited to be less than this value based on capacity of the RSS 124. For example, the segment may be the smaller segment of (a) bytes F(i−A) to F(i+C+B) and (b) bytes F(i−A) to F(i−A+G), where G is the available capacity of the RSS 124.

Figure 6:
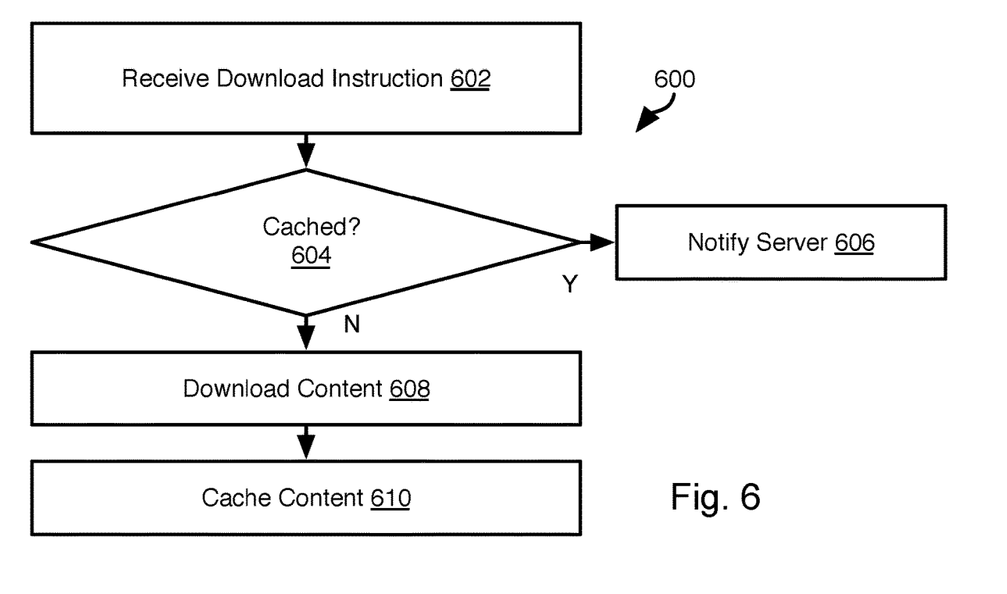
FIG. 6 is a process flow diagram of a method for caching content in a RSS in accordance with an embodiment of the present invention.

FIG. 6 illustrates a method 600 for downloading a segment of content determined according to the method 500 (or all of the content where possible) to the RSS 124. The method 600 may include receiving 602 a download instruction or notification from the server system 120. The download instruction may identify content and/or portion of content, e.g. a particular range of bytes within the content. The RSS 124 may then evaluate 604 whether the content and/or portion of the content is cached on the non-transitory storage of the RSS 124. If so, the RSS 124 may notify 606 the server system 120 of this fact and the server system 120 will refrain from downloading the content the RSS 124. If not, then the RSS 124 will request to download 608 the content from the server system 120 and cache 610 the content until it is requested by the vehicle. The content may also be cached after it is requested by the vehicle until it is purged, such as described below with respect to FIG. 7.

Figure 7:
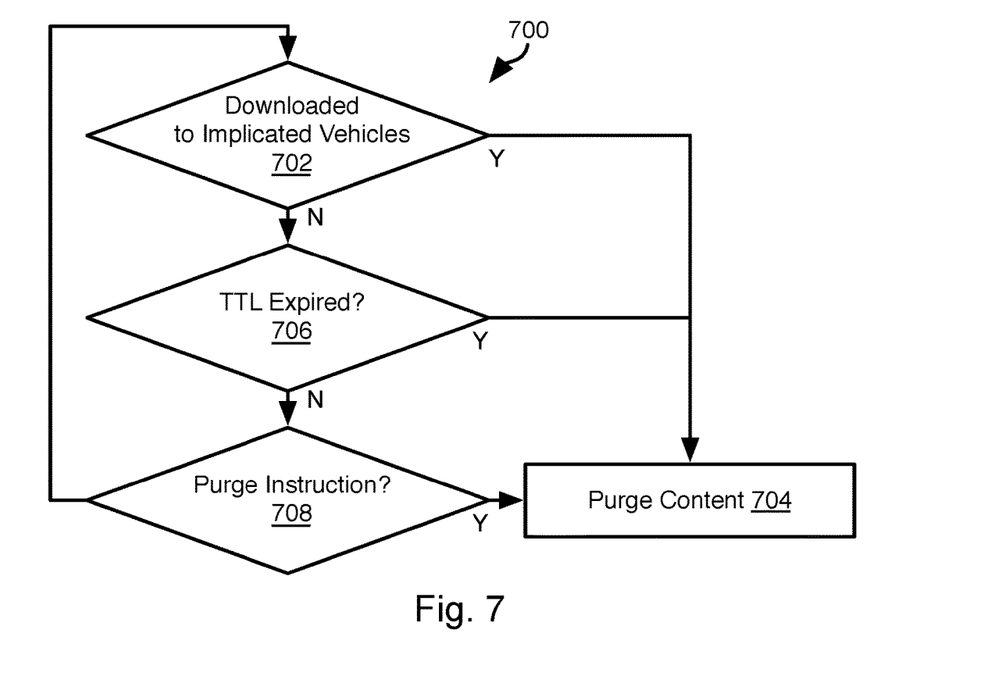
FIG. 7 is a process flow diagram of a method for purging content from an RSS in accordance with an embodiment of the present invention.

Referring to FIG. 7, the illustrated method 700 may be executed by the RSS 124 to determine how long to retain the content or the segments of the content (hereinafter referred to simply as "the content") transmitted to the RSS 124. In some instances, content may be transmitted with an indication of a number of vehicles that need the content, e.g. a fleet of vehicles or autonomous vehicles that will be passing by the RSS 124. Alternatively, identifiers of the vehicles that need the content will be transmitted to the RSS 124. In such instances, the method 700 may include evaluating 702 whether all of the implicated vehicles (either number or specific vehicles) have downloaded the content. If so, then the content may be purged 704, i.e. erased from the RSS 124 or marked as available to be overwritten.

In some instances, the content may be transmitted with a time to live (TTL), e.g. a number of minutes, hours, days, etc., that the content is to be retained after it is downloaded or after it is last transmitted to a vehicle. If this TTL for the content is found 706 to have expired, the content may be purged 704.

The content may also be purged 704 if an instruction from the server system 120 is found 708 to have been received that instructs the RSS 124 to purge the content.

Figure 8:
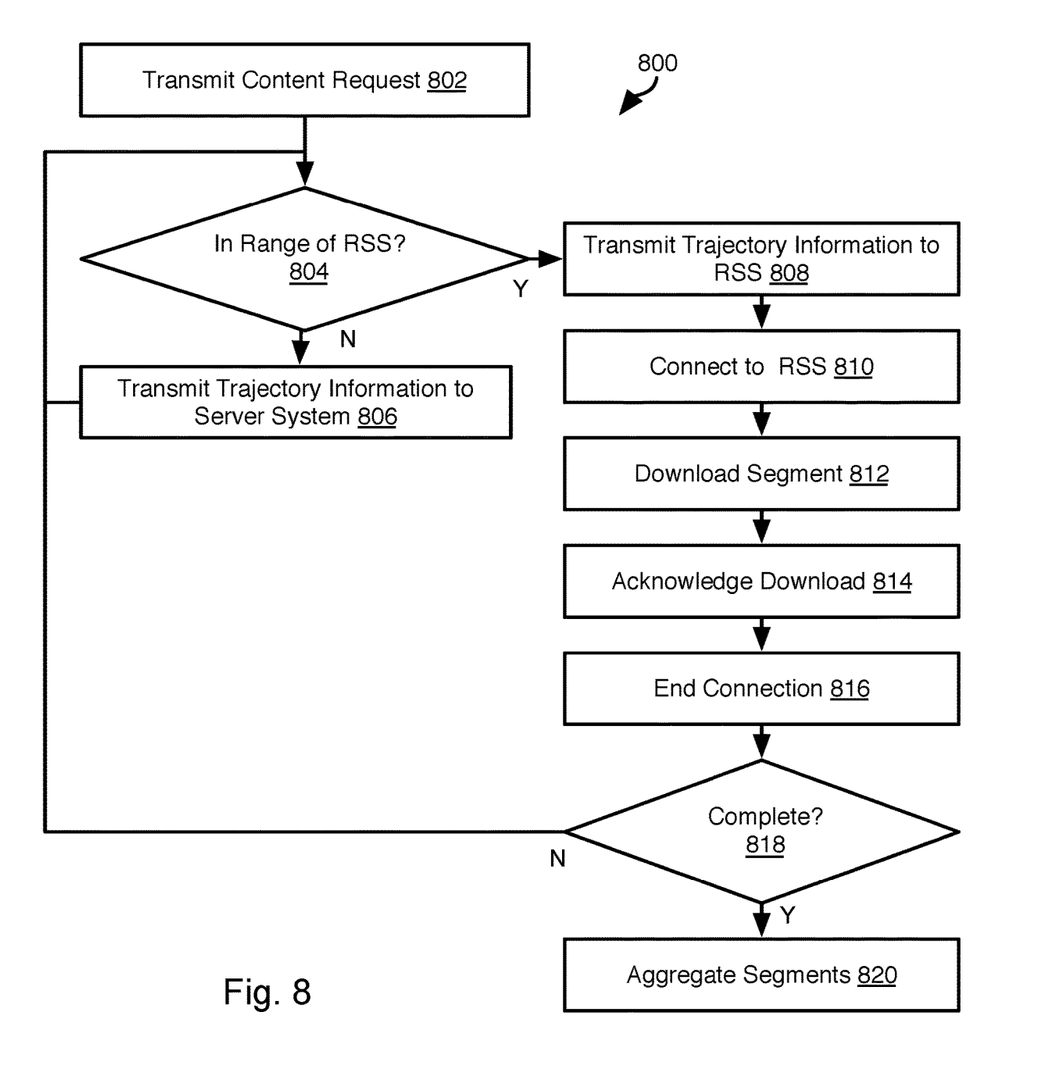
FIG. 8 is a process flow diagram of a method for downloading content by a vehicle controller in accordance with an embodiment of the present invention.

Referring to FIG. 8, the illustrated method 800 may be executed by the controller 102 of the vehicle. The method 800 may include transmitting 802 a request for the content to the server system 120 over the cellular network 122. The method 800 may further include, while the vehicle is found 804 not to be in range of an RSS 124, transmitting 806 trajectory information to the server system 120. For example, the server system 120 may transmit the locations of RSS 124 near the vehicle's or on the vehicle's reported or expected trajectory to the controller 102. The controller 102 may therefore determine from a GPS (global positioning system) coordinate of itself and that of the RSS 124 whether it is in range. Alternatively, the controller 102 may detect whether it is in range by detecting a signal transmitted by the RSS 124. In some embodiments, the server system 124 may transmit the trajectory information to the RSS 124 while the RSS 124 is out of range. The trajectory information may include a current location (GPS coordinate), navigation information (e.g., current route), speed, heading, and lane.

When the controller 102 determined 804 that it is within range of the RSS 124, the controller 102 may transmit 808 the trajectory information to the RSS 124 rather than to the server system 120. In this manner, the RSS 124 may determine where the vehicle is located and whether the vehicle is in a wireless communication range of the RSS 124. Step 808 may be performed throughout the vehicle's transit of the transit window 306 of the RSS 124.

The method 800 may further include connecting 810 to the RSS 124 and downloading 812 the content from the RSS 124, e.g. one or more segments downloaded to the RSS 124 according to the method 500. The controller 102 may acknowledge 814 to the RSS 124 that portion of the content downloaded at step 812 that was successfully received. The RSS 124 may report this fact to the server system 120, which will use this information to determine what portion of the content remains to be downloaded to the vehicle (see discussion of step 408 of FIG. 4, above).

The connection may then be ended 816, such as upon the vehicle going out of the transmission range of the RSS 124. If the controller determines 818 that all portions of the content have been downloaded, then segments of the content received from multiple RSSs 124 may be aggregated 820 to obtain the content. For example, the server system 120 may transmit a size of the content and segments may include metadata that indicates what portion of the content the segment represents. In this manner, the controller 102 has sufficient information to reconstruct the content and determine whether the content has been completely downloaded. If not, then the method 800 may continue at step 804 with respect to another RSS 124.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CDROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s). At least some embodiments of the disclosure have been directed to computer program products comprising such logic (e.g., in the form of software) stored on any computer useable medium. Such software, when executed in one or more data processing devices, causes a device to operate as described herein.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

What is claimed is:

1. A method comprising:
receiving, by a server system, trajectory data of a vehicle;
determining, by the server system, a trajectory of the vehicle from the trajectory data, the trajectory including a road;
determining, by the server system, that a first road side unit with storage (RSS) device is located along the trajectory prior to the vehicle being within a wireless transmission range of the first RSS device, the first RSS device being a computer system mounted along the road;
transmitting, by the server system to the first RSS device, content for downloading to the vehicle along with a set of identifiers, the set of identifiers referencing a plurality of vehicles, the plurality of vehicles including the vehicle;
storing, by the first RSS device, the content for downloading on the first RSS device prior to the vehicle being within the wireless transmission range of the first RSS device;
transmitting, by the first RSS device, the content to the plurality of vehicles and detecting vehicle identifiers of the plurality of vehicles when the plurality of vehicles travel along the road within the wireless transmission range of the first RSS device;
determining, by the first RSS device, that the content has been transmitted to all vehicles of the plurality of vehicles referenced in the set of identifiers; and
in response to determining that the content has been transmitted to all vehicles of the plurality of vehicles referenced in the set of identifiers, deleting, by the first RSS device, the content from the first RSS device.

2. The method of claim 1, further comprising:
receiving a request, by the server system from the vehicle over a cellular data network, for the content prior to transmitting the content to the first RSS device for downloading to the vehicle.

3. The method of claim 2, further comprising transmitting, by the first RSS device, the content to the vehicle over a different communication protocol than is implemented by the cellular data network.

4. The method of claim 1, further comprising:
identifying, by the server system, a plurality of RSS devices along the trajectory;
segmenting, by the server system, a data file into a plurality of data segments;
transmitting, by the server system, each segment of the plurality of data segments to one RSS device of the plurality of RSS devices, the content being one of the plurality of data segments.

5. The method of claim 4, further comprising:
estimating, by the server system, a plurality of expected velocities of the vehicle, each expected velocity being an estimate of a velocity of the vehicle in a vicinity of a corresponding RSS device of the plurality of RSS devices;
for each RSS device of the plurality of RSS devices:
determining an estimated transit time of the wireless transmission range of the each RSS device according to the expected velocity of the plurality of velocities of the vehicle corresponding to the each RSS device;
defining a segment of the plurality of segments corresponding to the each RSS device having a size corresponding to the transit time and transmission speed of the each RSS device; and
transmitting, to the each RSS device, the segment of the plurality of segments corresponding to the each RSS device.

6. The method of claim 1, further comprising:
detecting, by the server system, a change in the trajectory of the vehicle to a new trajectory;
in response to detecting the change in the trajectory of the vehicle to the new trajectory, identifying, by the server system, a second RSS device lying on the new trajectory; and
transmitting, by the server system, the content to the second RSS device.

7. The method of claim 1, wherein the trajectory data comprises navigation data from the vehicle.

8. The method of claim 1, wherein from the trajectory data comprises a current bearing of the vehicle.

9. A system comprising:
a plurality of a road side unit with storage (RSS) devices distributed throughout a geographic area, each RSS device of the plurality of RSS devices being a computer system mounted within the geographic area; and
a server system in data communication with the plurality of RSS devices, the server system including one or more processing devices and one or more memory devices, the one or more memory devices storing executable code effective to cause the one or more processing devices to:
receive trajectory data with respect to a vehicle;
determine a trajectory of vehicle from the trajectory data, the trajectory including one or more roads;
identify one or more selected RSS devices from the plurality of RSS devices that are mounted along the one or more roads of the trajectory prior to the vehicle being within one or more wireless transmission ranges of the one or more selected RSS devices; and
transmit content to the one or more selected RSS devices for downloading to a plurality of vehicles along with a set of identifiers of the plurality of vehicles, the plurality of vehicles including the vehicle;
wherein each RSS device of the one or more selected RSS devices is further programmed to:
transmit the content to the plurality of vehicles and detect vehicle identifiers of the plurality of vehicles when the plurality of vehicles travel along the road within the wireless transmission range of the each RSS devices;
determining, by the each RSS device, that the content has been transmitted to all vehicles of the plurality of vehicles referenced in the set of identifiers; and
in response to determining, by the each RSS device, that the content has been transmitted to all vehicles of the plurality of vehicles referenced in the set of identifiers, deleting the content from the each RSS device.

10. The system of claim 9, wherein the executable code is further effective to cause the one or more processing devices to:
receive a request for the content from the vehicle over a cellular data network prior to transmitting the content to the one or more selected RSS device for downloading to the vehicle.

11. The system of claim 10, wherein the plurality of RSS devices are programmed to transmit data over a different communication protocol than is implemented by the cellular data network.

12. The system of claim 9, wherein the one or more selected RSS devices are a plurality of selected RSS devices;
wherein the executable code is further effective to cause the one or more processing devices to:
segment the content into a plurality of data segments; and
transmit each segment of the plurality of data segments to one RSS device of the plurality of selected RSS devices.

13. The system of claim 12, wherein the executable code is further effective to cause the one or more processing devices to:
estimate a plurality of expected velocities of the vehicle, each expected velocity being an estimate of a velocity of the vehicle in a vicinity of a corresponding RSS device of the plurality of selected RSS devices;
for each RSS device of the plurality of selected RSS devices:
determine an estimated transit time of the wireless transmission range of the each RSS device according to the expected velocity of the plurality of velocities of the vehicle corresponding to the each RSS device;
define a segment of the plurality of segments corresponding to the each RSS device having a size corresponding to the transit time and transmission speed of the each RSS device; and
transmit, to the each RSS device, the segment of the plurality of segments corresponding to the each RSS device.

14. The system of claim 9, wherein the executable code is further effective to cause the one or more processing devices to:
if a change in the trajectory of the vehicle to a new trajectory is detected, select different one or more RSS devices of the plurality of RSS devices as the selected one or more RSS devices, the different one or more RSS devices lying along the new trajectory;
transmit the content to the different one or more RSS devices.

15. The system of claim 9, wherein the executable code is further effective to cause the one or more processing devices to determine the trajectory of the vehicle by receiving navigation data from the vehicle.

16. The system of claim 9, wherein the executable code is further effective to cause the one or more processing devices to determine the trajectory of the vehicle by inferring the trajectory from a current bearing of the vehicle.

* * * * *